Feb. 6, 1940. F. P. KAMP 2,189,346
AUTOMATIC LOCK OPENER
Filed March 13, 1939  2 Sheets-Sheet 1
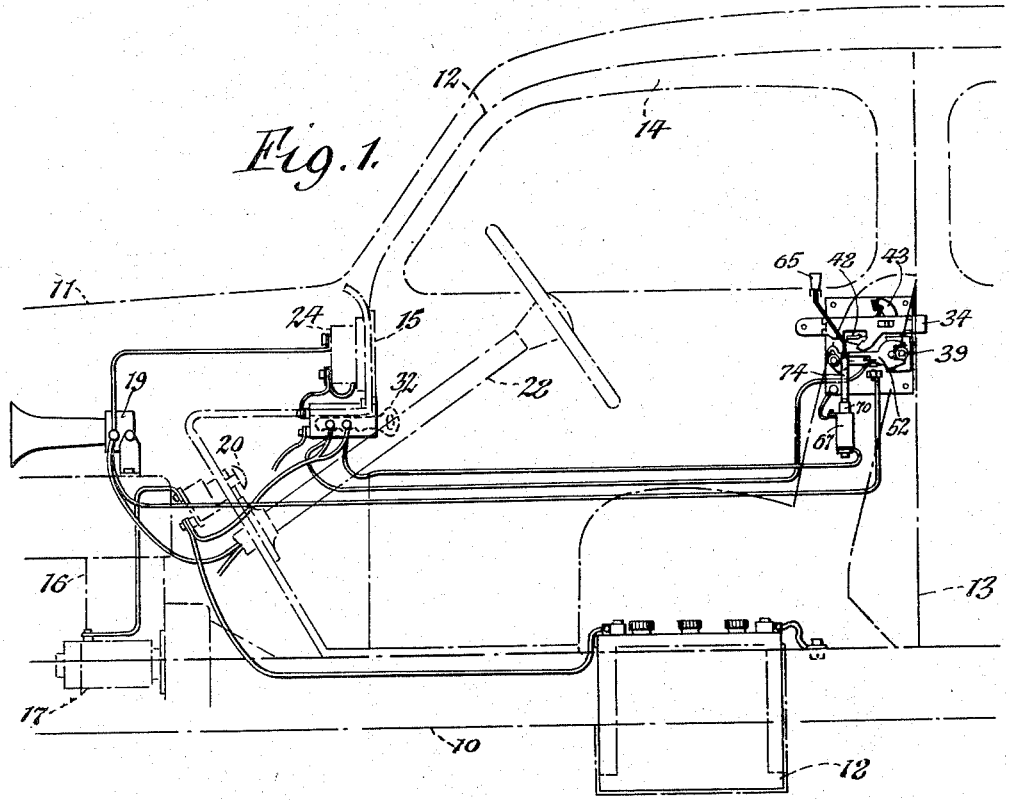
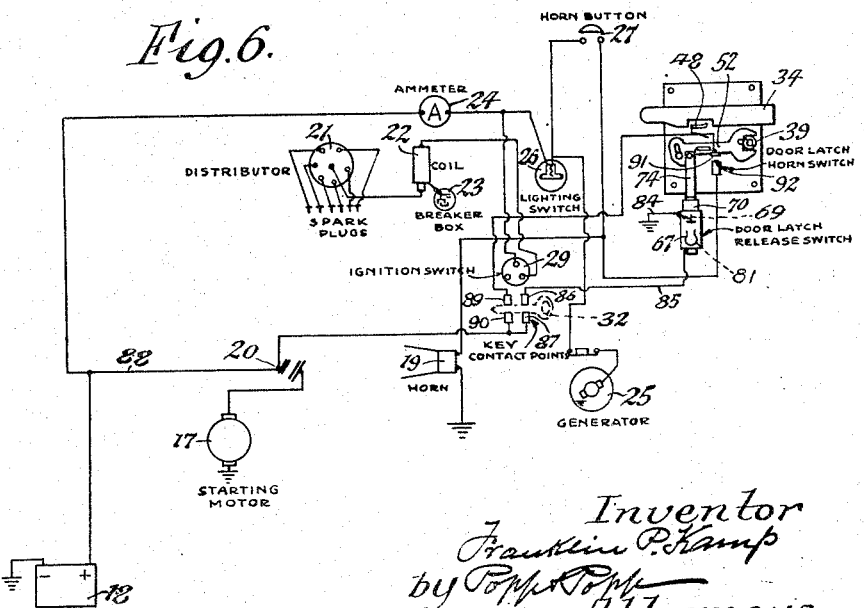
Inventor
Franklin P. Kamp
by Popp & Popp
Attorneys

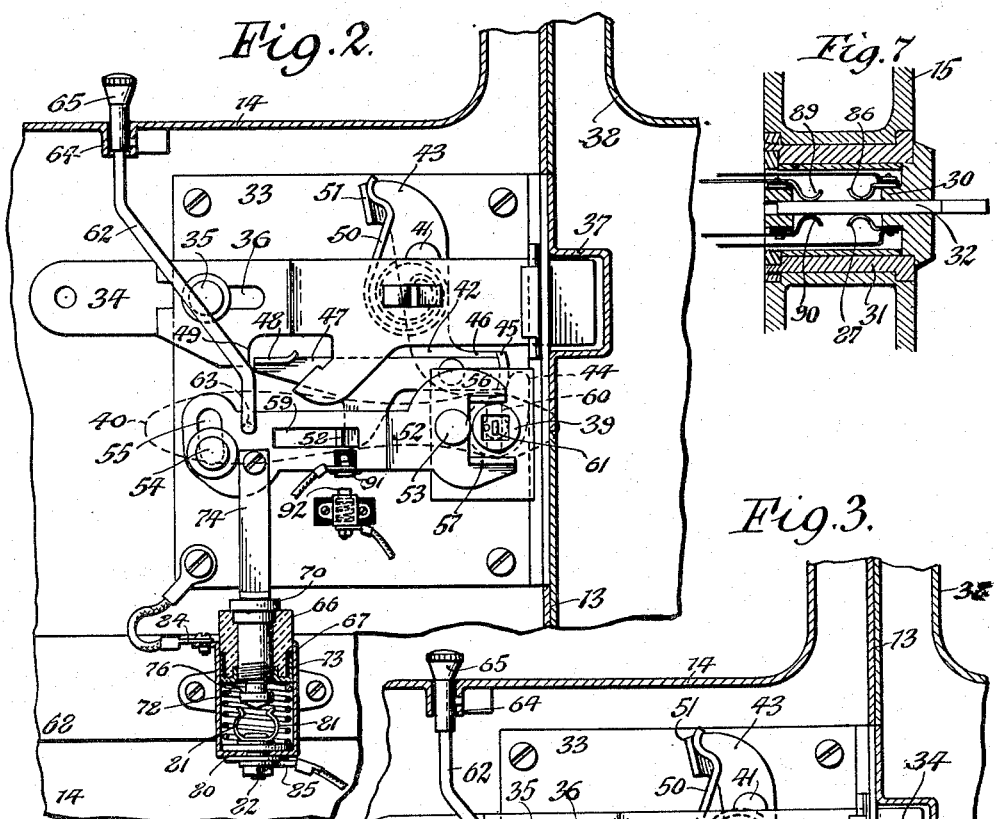

Patented Feb. 6, 1940

2,189,346

UNITED STATES PATENT OFFICE 2,189,346

AUTOMATIC LOCK OPENER

Franklin P. Kamp, Eggertsville, N. Y.

Application March 13, 1939, Serial No. 261,427

1 Claim. (Cl. 70—279)

This invention relates more particularly to an automatic lock unsetting or releasing device which is more particularly designed for use in connection with automobiles which are provided with locks which can be set so that the closing of the door will automatically lock the door without requiring the use of a key for this purpose.

Various forms of automatically operating locking devices may be used in connection with this invention, for example, that which is shown in the United States Patent No. 2,039,873, dated May 5, 1936, and to which reference may be had for a detail explanation.

As is well known to those who have had experience with this type of automatically locking lock it sometimes happens that the driver will leave the ignition key sticking in the ignition switch while the latter is either turned on or off and then closes the door of the car after setting the automatically locking lock, with the result that the driver loses access to the key of the ignition system and is therefore inconvenienced unless he has a spare key available outside of the car. This often necessitates breaking a window pane of the car in order to gain access to the inside of the compartment for retrieving the ignition key or unsetting the lock of the door.

It is the object of this invention to provide means whereby the lock of the door of the passenger compartment may be automatically unset in the event that the same has been preset to lock the door automatically upon closing the same when the driver has left the ignition key inserted in the ignition switch, thereby avoiding the necessity of breaking any window or damaging other parts of a car for the purpose of getting at the key or the ignition system.

With this end in view this invention consists generally of a thermostatic unsetting device which is associated with the controlling mechanism of the lock and placed in circuit with an electric source whenever the ignition key is left in the ignition switch and the compartment door is automatically locked when moved into a closed position and whereby this thermostatic unsetting device will become heated in response to the electric current supplied thereto and operate automatically to unset the lock and permit the door to be opened without the use of a key.

In the accompanying drawings—

Fig. 1 is a diagrammatic elevation of an automobile showing this invention in connection with its door lock having means for setting and unsetting the automatic control device thereof, and the electrical accessories of the car.

Fig. 2 is a fragmentary vertical longitudinal section of a portion of a side wall and door of a car showing this invention in connection with the controlling device for a door lock of the type shown in the above mentioned Patent No. 2,039,873 in an unset position.

Fig. 3 is a view similar to Fig. 2 but showing the parts in the position which they occupy when the controlling device of the lock has been set so that the door upon being closed will be locked in its closed position and incapable of being again opened excepting by the use of a proper key applied to the exterior of the lock.

Fig. 4 is a fragmentary vertical section, on an enlarged scale, of the thermostatic shifting means which are responsive to the heating effect of an electrical circuit and whereby the controlling mechanism of the lock is automatically unset without manual aid.

Fig. 5 is a horizontal section taken on line 5—5, Fig. 4.

Fig. 6 is a diagrammatic view showing a preferred arrangement of the electrical circuits of the car in connection with this invention.

Fig. 7 is a fragmentary longitudinal section, on an enlarged scale, showing one form of switch means whereby the electric circuit of the automatic lock unsetting mechanism is closed upon inserting the ignition key into the ignition switch and opened when this key is removed from said switch.

In the following description similar characters of reference indicate like parts in the several figures of the drawings:

This invention is more particularly adapted for use in automobiles which are driven by gas engines in which the fuel is ignited by electrical means, and have a passenger or driver's compartment, a wall of which is provided with a doorway and a door for said doorway, and a lock for the door which may be preset from the inside of the compartment by means of keyless manually operable means so that the door when closed will be automatically locked in its closed condition and require the use of a separate manually operable key for again unlocking the lock for permitting the door to be opened.

The automobile which is shown diagrammatically in Fig. 1 comprises a chassis or frame 10 of any suitable construction, a body mounted on the frame and provided with a hood 11 which covers the engine and associated parts for propelling the car, a closed compartment 12 arranged in rear of the hood and adapted to be occupied by the driver of the car and any passengers accompanying him, a doorway or opening 13 in the side wall of the body through which the driver enters and leaves the compartment 12, a laterally movable door 14 adapted to be moved into and out of a position across said doorway, and an instrument board or panel 15 arranged crosswise between the hood and the driver's compartment.

Under the hood is arranged the propelling engine 16 for moving the car, which engine is adapted to be started by means of a starting motor 17 in any well known manner. In rear of the engine a storage battery 18 or other electric source is located for supplying the necessary current whereby the starting motor 17 is operated, and other electrical accessories of the car are supplied with electric current such as the sparks for igniting the charges of fuel in the working cylinders of the gas engine, also operating the horn 19 or other signaling device with which the car is provided and also lighting the various electric lamps with which the car is equipped. As shown in the wiring diagram, Fig. 6 of the drawings, the opening and closing of the circuit which includes the storage battery 18 and the starting motor 17 of the gas engine is controlled by a starting switch 20 which may be of any suitable and well known construction and operated either by foot or hand power in the usual manner.

The circuit of the ignition system for the engine includes the usual distributor 21 whereby the current is directed successively to the several spark plugs of the engine and this circuit also contains the usual induction coil 22, circuit breaker 23 and ammeter 24. The electrical system also includes the usual electric generator 25 which is operated by power derived from the gas engine 16, the lighting circuit contains the usual lighting switch 26, and the electric circuit of the signal horn 19 contains the usual hand operated switch 27 adapted to control the circuit for operating this horn.

The circuit which controls the passage of the electric current for operating the ignition system of the engine contains a switch which is diagrammatically represented at 29 in Fig. 6 and may be operated by means of a removable key 32, as shown in Fig. 7. As there shown, the numeral 30 represents the rotatable barrel of the key operated ignition switch 29 which is journaled in a casing 31 mounted on the panel, instrument or dash board 15 of the car and which upon being turned in one direction or the other causes the contacts of the ignition switch 29 to be engaged and disengaged for opening and closing the circuit which includes the spark plugs and the rest of the ignition system of the engine in the usual and well known manner.

The ignition switch barrel 30 in the present case is adapted to be oscillated for opening and closing the electric circuit of the ignition system by means of the key 32 which is adapted to be inserted lengthwise into the central part of the rotary barrel 30 preparatory to starting the propelling motor 16 of the car and to be removed therefrom when it is desired to stop this motor.

Any suitable form of door lock may be employed which will automatically lock the door in its closed position upon merely closing the door but which requires the use of a key from the outside of the car in order to again unlock the lock and permit of opening the door, the mechanism of said lock having means whereby the same may be preset from the inside of the car preparatory to effecting automatic locking of the door upon swinging the same into a closed position. An example of a lock designed to operate in the manner described is disclosed in United States Patent No. 2,039,873, the essential parts of which are constructed and operated as follows:

Referring to Figs. 1, 2, 3 and 6, the numeral 33 represents a lock casing or frame mounted on the door 14 of the car compartment and supporting the main parts of the door lock in such manner that they are concealed from view both from the inner side and the outer side of the car. The numeral 34 represents a horizontally and longitudinally slidable locking bolt which is guided on the casing 33 by means which include a guide pin 35 arranged on the casing 33 and passing through a longitudinal slot 36 in this bolt. The front end of this locking bolt is adapted to project from the face or locking edge of the door into a keeper 37 on the adjacent wall 38 of the car body for the purpose of retaining the door in its closed position, but this bolt is capable of retraction so that its front end is withdrawn from the keeper 37 and is flush with the locking face of the door so that the latter can be moved laterally into and out of a position in which it extends across the doorway 13 in the respective wall of the car. The retraction of this bolt into its inoperative position is effected by means which include a transverse operating shaft or spindle 39 journaled in the lock casing 33 and provided on the exterior of the door with a manually operable handle 40 whereby the shaft may be turned in the direction for retracting the locking bolt 36. Motion is transmitted from this shaft 39 to the locking bolt by means of a shifting lever pivoted on the casing 33 by a pin 41 and having a lower arm 42 and an upper arm 43, a roll back arm 44 mounted on the shaft 39 and engaging with a curved lug 45 on the lower arm 42 of the shifting lever, a coupling lever pivoted on the lower arm 42 of the shifting lever and having a front arm 46 engaging with the curved lug 45 and a rear arm 47, and a coupling lug 48 mounted on the rear arm 47 and movable into and out of the path of a forwardly facing shoulder 49 on the lower edge of the locking bolt 34. A spring 50 mounted on the locking bolt and bearing against a shoulder 51 on the upper arm 43 of the shifting lever operates to move these parts in the opposite direction and to project the locking bolt into interlocking engagement with the keeper 37.

Normally the coupling lever is turned in a position in which its coupling lug 48 is elevated in line with the shoulder 49 of the locking bolt 34 and the latter is projected by the spring 50 into its operative locking position in which the front end of the locking bolt engages with the keeper 37, as shown in Fig. 2. Upon turning the shaft 39 in an anti-clockwise direction, when viewed from the side shown in Fig. 2, the roll back 44 engages with the lug 45 of the shifting lever and moves the lower arm 42 thereof together with the coupling lever mounted thereon in a backward direction, whereby the lug 48 of the coupling lever will engage the shoulder 49 of the locking bolt and move the latter backwardly so that its front end is retracted from the keeper 37. During such movement, the spring 50 will be increasingly strained so that when the unlocking or opening presure on the handle 40 is released this spring 50 will react and cause the locking bolt 34 to be projected into its operative position, and also cause the shifting lever to be turned so that its lower arm 42 moves outwardly together with the coupling lever mounted thereon and the operating shaft 39 to be turned in a clockwise direction. Upon turning the operating shaft 39 in an anti-clockwise direction when the inner arm 47 of the coupling lever is in a depressed position and its coupling lug 48 is below the shoulder 49 of the locking bolt, as shown in Fig. 3, then the anti-clockwise rotation of the roll back or arm 44 will move the lower shifting arm 42 and the coupling lever pivoted thereto inwardly with an idle stroke without carrying along the locking bolt in the same direction so that the latter will remain in its locked position. During this time an increased tension will be produced on the spring 50 due to the outward movement of the upper arm 43 of the shifting lever without, however, influencing the position of the locking bolt.

Controlling mechanism is provided in connection with this lock for moving the coupling lever into a position in which the same sets the lock so that the locking bolt may be retracted by turning the handle 40 on the outside of the car or this operating mechanism may be unset so that a turning movement of this handle from the outside of the car will be idle and not effect a retracting movement of the locking bolt but instead leave the same at rest in its locked position. This controlling mechanism includes key operated means which are operable only from the outside of the car body or compartment and also non-key operated means which are only operable from the inside of this compartment, whereby the lock may be set from the inside of the compartment so that a mere closing of the door will automatically lock the same and necessitate unsetting the same by the use of a key applied to the key controlled operating mechanism from the outside of the compartment before the door can be again opened. The mechanism disclosed in United States Patent No. 2,039,873 and shown in the accompanying drawings is an example of mechanism suitable for the purposes of this invention. As shown in Figs. 1, 2, 3 and 6 this controlling mechanism is constructed essentially as follows:

The numeral 52 represents the rear arm of a controlling lever which is pivoted by means of a pin 53 on the lock casing or frame so as to swing in a plane which is vertical and parallel with the direction of movement of the locking bolt and is guided at its rear end on the lock casing by means of a pin 54 secured to this casing and passing through a vertical slot 55 in the rear end of this arm. The front arm of this controlling lever is constructed in the form of a fork, the upper and lower branches 56 and 57 of which are arranged, respectively, above and below the operating shaft 39 of the lock. On the central part of its underside the rear arm 47 of the coupling lever is provided with a laterally projecting guide lug 58 which engages with a horizontal guide slot 59 formed in the rear arm 52 of the controlling lever. Upon turning the controlling lever so that its rear arm 52 is elevated, as shown in Fig. 2, the guide slot 59 thereof will be arranged in a horizontal position, whereby the coupling lever will be turned so that its rear arm 47 is in an elevated position with its lug 48 arranged in front of the shoulder 49 of the locking bolt. Upon turning the roll back 44 anti-clockwise at this time, while the rear arm 47 of the coupling lever is elevated, the coupling lug 48 will engage with the shoulder 49 of the locking bolt due to the guide lug 58 of the coupling lever sliding horizontally rearwardly in the guide slot 59 of the controlling lever. Upon, however, lowering the rear arm 52 of the controlling lever so that its guide slot is in a rearwardly inclined position, as shown in Fig. 3, the rear arm 47 of the coupling lever will be lowered so as to bring its coupling lug 48 below the shoulder 49 of the locking bolt, whereby a rotary movement of the roll back 44 in an anti-clockwise direction will cause the coupling lever to move backwardly and downwardly at an angle relative to the locking bolt so that the coupling lug 48 will miss the shoulder 49 of the locking bolt and thereby fail to move the latter backwardly but instead leave the same at rest in its forwardly projected locked position.

The key operated means whereby this controlling lever may be shifted so as to couple the locking bolt with the shifting means or uncouple the same therefore may be variously organized but as generally indicated in Figs. 2 and 3, the same comprises a pawl 60 mounted on the operating shaft 39 so as to move transversely thereon and capable of projecting either at its upper or its lower end beyond the periphery of the operating shaft 39, and a key mechanism mounted within this operating shaft and adapted to be operated by means of a removable key 61 which is insertable into the tumbler or pin barrel 31 of the lock from the exterior of the car body or compartment and actuating the pawl 60 so that the same projects either upwardly or downwardly from a central or neutral position relative to the axis of the operating shaft 39.

In the unset condition of the lock, as shown in Fig. 2, the pawl 60 has been shifted by the key operated mechanism from the exterior of the car body so that this pawl is in its central or neutral position and the inner arm 52 of the controlling lever is elevated so that an anti-clockwise or backward movement of the roll back 44 will cause the locking bolt 34 to be shifted into its open or unlocked position. If it is desired to set the bolt 34 in its closed or locked position by means of the key 61 from the outside of the car body or compartment, this key is inserted in the tumbler mechanism of the lock and turned in the proper direction so that the pawl 60 will be raised into engagement with the upper branch 56 of the control lever, whereby the rear arm 52 of the latter is depressed into the position shown in Fig. 3. When the parts are in this position the movement of the handle 40 from the outside of the car will not be transmitted to the locking bolt and the latter will therefore remain in its locked position. Upon moving the tumbler mechanism of the lock in the opposite direction by means of the key 61 from the outer side of the car body, the pawl 60 will be projected at its lower end from the operating shaft and engage with the lower front branch 57 of the controlling lever and thereby again elevate the rear arm 52 so as to lift the coupling lug 48 into an operative position relative to the shoulder 49 of the locking bolt.

The non-key operated means whereby the lock may be either set or unset from the inside of the car body or compartment independently of the key mechanism which is adapted to be set and unset from the outside of the same by means of a key preferably comprises an angular shifting rod 62 having its lower part arranged within the lock casing or frame and its lower end pivotally connected at 63 with the rear arm 52 of the controlling lever while the upper part of this shifting rod extends through an upright guideway 64 in the adjacent part of the door frame and terminates in an upwardly projecting button or fingerpiece 65 which is only accessible from the interior of the car body when the windows of the car are closed. Upon grasping this button 65 by the fingers the rear arm 52 of the controlling lever may be raised or lowered through the medium of the shifting rod 62. If now the shifting rod 62 is raised through the medium of the finger-piece 65, the rear arm 52 of the control lever will be raised, as shown in Fig. 2, and thereby set the parts of the lock so that an anti-clockwise movement of the roll back 54 will cause the locking bolt 34 to be retracted into its unlocked position, while upon depressing the shifting rod 62 by means of this button, this rear arm of the controlling lever will be depressed, as shown in Fig. 3, thereby uncoupling the locking bolt from the shifting mechanism which is actuated by the external handle 40 and preventing the operation of this handle from moving the locking bolt backwardly and unlatching or unlocking the same.

When the locking mechanism is thus unset from the inside of the car body by the depression of the shifting rod 62 and the controlling arm 52 so that the turning of the hand lever 40 from the exterior of the car body will not retract the locking bolt, then the mere closing or shutting of the door into a position across the doorway will cause the locking bolt 34 to automatically snap into its locked position and remain there so that the door cannot be again opened until the rear arm 52 of the controlling lever has been raised from the exterior of the car by proper mainipulation of the key operated mechanism from the exterior of the car or by raising of the manually operative non-key mechanism on the inside of the car body.

The particular means which are shown in the drawings embodying this invention whereby the lock of the door is automatically unset or unlocked so that the door can be opened from the outside without the use of a key in case the driver leaves the ignition key 32 sticking in the switch of the ignition system are constructed as follows:

The numeral 66 represents the body of a plunger which reciprocates vertically and is guided in an upright tubular guide or holder 67, said plunger and holder being preferably of circular or cylindrical form. The plunger is preferably constructed of light material such as glass or Bakelite and the cylindrical guide 67 is constructed of metal. The holder 67 is secured to any available part which is stationary relative to the casing of the lock 33, such as a cleat 68 mounted on the inner side of the door 14 below the lock casing, as shown in Figs. 2 and 3.

Extending centrally through the plunger 66 is a pin or bolt 69 which is provided at its upper end with a head 70 while its lower end is connected by means of a screw joint 71 with a disk 72 bearing against the lower end of the plunger 66. This pin, head and disk are constructed of metal and the latter is provided on its opposite sides with resilient tongues 73 which are adapted to slide in contact with the inner side of the guide tube 67 and maintain a good electrical engagement therewith. The upper head 70 of the pin 69 bears against the lower end of an upright push bar 74 which is secured to the inner arm 52 of the controlling lever and projects downwardly therefrom.

At its lower end the pin 69 is provided with a contracted neck 75 which forms an upwardly facing shoulder 76 thereon and on its underside this pin is provided with a downwardly tapering conical face or cone 77. When free, the plunger 66 together with the parts mounted thereon is raised by means of a spring 78 which is arranged in the tubular guide 67 and bears at its upper end against the underside of the lower disk 72 on the plunger while the lower end of this spring bears against a disk 79 resting on the bottom 80 of the tubular guide, as best shown in Fig. 4.

The plunger is held in its depressed position by means of a catch comprising two hook-shaped detent jaws 81 which are adapted to engage over opposite sides of the upwardly facing shoulder 76 of the plunger pin while the lower ends of these jaws are connected with each other and are attached to the bottom of the tubular guide 67 by means of a clamping bolt 82 but electrically insulated therefrom by means of the insulation 83. The two detent jaws 81 are constructed of two strips of metal having different coefficients of expansion in response to changes of temperature and are integrally connected with each other so as to form substantially the letter C. These jaws are adapted to form part of an electric circuit which upon being closed will cause the jaws to be heated due to the electrical resistance which is encountered as the current flows through these jaws. When the electric current through these detent jaws is broken then these jaws become cool and automatically contact so that the upper hook-shaped ends thereof will be contracted or moved toward each other a sufficient extent that they are arranged in the path of the lower part of the plunger pin 69. When, however, the jaws are heated by the passage of an electric current through the same, the hook-shaped ends thereof will be separated due to the straightening out of these jaws and thereby move the hook-shaped ends thereof out of the path of the lower end of this plunger pin.

The current for thus heating these thermostatic detent jaws may be derived from any suitable electric source, for instance, by including the same in an electric circuit containing the storage battery 18. In this circuit one wire 84 connects the metallic guide 67 with a grounded part of the automobile, and another wire 85 connects the clamping bolt 82 with means whereby the circuit may be closed and opened at the ignition switch by the use of the same key 32 which opens and closes the ignition switch 29. In order to utilize the ignition key 32 for the purpose of opening and closing the electric circuit which includes the storage battery and the jaws 81 of the thermostatic detent or catch various switch means may be employed, but as shown in Fig. 7, the same consist of two spring contacts 86 and 87 which are mounted on the inner side of the rotary tumbler barrel 30 of the ignition switch but insulated therefrom and connected respectively with the wire 85 leading to the thermostatic catch jaw 81 and wire 88 leading to the storage battery 18.

Assuming now that the driver of a car has left the ignition key 32 sticking in the ignition switch 29 and has closed the door after having depressed the shifting rod 62. Under these circumstances the lock of the door could not be opened from the outside of the compartment without the use of a door key 61 and this would necessitate destroying some part of the car in order to gain access to the ignition key which is still sticking in the ignition switch. Such procedure, however, is now unnecessary inasmuch as the ignition key, while still inserted in the ignition switch, closes the electric circuit across the two contacts 86 and 87 and controlling arm 52 which has been lowered by means of the shifting rod 62 causes the push bar 74 to push the plunger 66 downwardly a sufficient extent to engage the conical lower side of the pin 69 so that it first spreads the resilient detent jaws 81 and then permits the latter to contract into engagement with the upwardly facing shoulder 76 of this pin and thereby not only hold this plunger in its lowered position, but also completing the electric circuit of the battery at this point, as shown in Fig. 4.

When this occurs the current from the battery will flow through the bimetallic jaws of the thermostatic catch or detent and cause the same to be heated, whereby these jaws will expand and disengage themselves from the shoulder 76 of the plunger pin. The instant this occurs the plunger 66 will be released and permit the resilience of the spring 78 to push the plunger upwardly, whereby the electric circuit of the battery will be broken between the thermostatic jaws and the plunger pin and at the same time the plunger will be pushed upwardly against the bar 74 by the spring 78 so that the controlling arm 52 is raised from its lowered position, shown in Fig. 3, to its elevated position, shown in Fig. 2, thereby automatically restoring the parts of the lock into the position which they must occupy in order to permit the bolt of the lock to be retracted from its keeper by the manual operation of the handle 40 without using a door lock key for this purpose.

After the plunger has been elevated and its pin 69 has been disengaged from the thermostatic detent jaws 81 and the circuit between these jaws and the plunger pin has been broken, these thermostatic jaws again become cool and contract toward each other so that they are in a position to be again engaged with the shoulder 76 of the plunger for holding the latter in its depressed position for again automatically opening the door in the event that manual setting of the door lock has been effected from the inside of the automobile compartment and the door is locked shut automatically when the driver leaves the ignition key sticking in the ignition switch.

It will now be apparent that this organization will positively prevent the lock of the door from remaining in a locked condition for any considerable time if the door is automatically locked from the outside while the ignition key still remains in the ignition lock and thereby avoids the annoyance and inconvenience as well as the necessity for destroying some part of the car in order to gain access to the ignition key within the compartment as has frequently been the case heretofore when using locks of the type mentioned.

In addition to automatically opening the door lock in the manner described, signal control means are provided for giving a signal which informs the driver immediately after automatically locking the door, which signal is preferably organized to give an audible alarm and thereby inform the driver of his predicament. Although this signal control device may be variously organized, the same preferably comprises two electric contacts 89 and 90 which are mounted on the rotary tumbler barrel 30 of the ignition switch and are included in a circuit which contains the storage battery 18 and the electrically operated horn 19 so that by inserting the ignition switch 32 into the barrel 30 of the ignition switch, these contacts 89 and 90 will be electrically connected. In addition to this a switch is provided which closes this signal or alarm circuit upon depressing the controlling arm 52 and opens this circuit upon raising this arm while setting and unsetting the automatic door locking mechanism.

In the preferred construction this last mentioned switch comprises an upper contact 91 which is mounted on the rear controlling arm 52 but insulated therefrom and a lower contact 92 mounted on the lock casing 33 but insulated therefrom. When the controlling arm 52 is raised the contacts 91 and 92 are disengaged, as shown in Figs. 2 and 6, so that the alarm circuit at this place will be broken and no sounding of the horn 19 will be given, notwithstanding that the ignition key 32 has been inserted in the ignition lock and electrically connects the contacts 89 and 90.

When, however, the ignition key 32 is left sticking in the ignition switch 29 and electrically connects the switch contacts 89 and 90 of the alarm circuit and the operator or driver depresses the setting button 65 preparatory to effecting automatic locking of the door when the same is closed, then the lowering of the rear controlling arm 52 will bring the upper contact 91 in engagement with the lower contact 92, whereby the electric circuit which includes the electric horn, will be completely closed and immediately sound a signal and warn the driver of his error in leaving the ignition key sticking in the ignition switch so that he can retrieve the key before leaving the car.

Although this automatic lock opener is shown in the drawings and described herein as more particularly useful in connection with automobiles, the same is equally applicable in other installations where analogous conditions exist. For example, such an organization may be used to advantage in connection with bank vaults to permit persons who have become accidentally locked in a vault to close an electric circuit within the vault and thereby automatically open a lock which locked the door shut and temporarily imprisoned the occupant. This invention is also useful as a means for controlling the operation of a lock located at a point remote from the place where the operator is stationed. The use of this invention under these circumstances not only saves annoyance and inconvenience, but often saves time and also possible destruction of property which otherwise would be necessary to restore normal conditions.

I claim as my invention:

In an automobile, the combination with a passenger compartment provided with a doorway, a door for opening and closing said doorway, a lock for said door having a bolt movable into and out of operative and inoperative positions, key actuated means operable from the outside of said compartment for controlling the position of said bolt, internal manual setting means operable from the inside of said compartment for rendering said bolt operative or inoperative, a prime mover having an electric ignition system, a key operated ignition switch arranged within said compartment for controlling said ignition system, and a removable key for operating said ignition switch; of a plunger associated with said internal setting means and adapted to be retracted for permitting said setting means to assume a position which holds said bolt in its operative position and also to be projected for shifting the setting means into a position which allows said bolt to be moved into an inoperative position, detent means for holding said plunger in its retracted position, thermo-electric shifting means operating when cool to hold said detent means in a working position in which the plunger is retracted and when hot to disengage said detent means from said plunger and release the latter to permit the same to be projected, an auxiliary electric circuit containing said thermo-electric shifting means, an automatic electric switch arranged in said auxiliary circuit and adapted to be closed when said plunger is retracted and opened when said plunger is projected, and a manually controlled electric switch included in said auxiliary circuit and adapted to be closed upon inserting said key into said ignition switch.

FRANKLIN P. KAMP.